US012356089B2

(12) United States Patent
Rizk et al.

(10) Patent No.: US 12,356,089 B2
(45) Date of Patent: Jul. 8, 2025

(54) SENSING AND PROCESSING UNIT GENERATING A TRIGGER SIGNAL UPON OCCURRENCE OF SPECIFIED CONDITIONS

(71) Applicant: Fris, Inc., Baltimore, MD (US)

(72) Inventors: Charbel Rizk, Raleigh, NC (US); Chad Thomas Howard, Rosedale, MD (US); Gastón Vilches, Buenos Aires (AR)

(73) Assignee: Fris Inc., Rochester, NY (US)

( * ) Notice: Subject to any disclaimer, the term of this patent is extended or adjusted under 35 U.S.C. 154(b) by 0 days.

(21) Appl. No.: 17/678,881

(22) Filed: Feb. 23, 2022

(65) Prior Publication Data

US 2022/0272285 A1   Aug. 25, 2022

Related U.S. Application Data

(60) Provisional application No. 63/152,776, filed on Feb. 23, 2021.

(51) Int. Cl.
*H04N 25/44* (2023.01)
*H04N 25/42* (2023.01)
*H04N 25/47* (2023.01)
*H04N 25/77* (2023.01)
*H04N 25/78* (2023.01)

(52) U.S. Cl.
CPC ............ *H04N 25/44* (2023.01); *H04N 25/42* (2023.01); *H04N 25/47* (2023.01); *H04N 25/77* (2023.01); *H04N 25/78* (2023.01)

(58) Field of Classification Search
CPC ...... H04N 25/44; H04N 25/75; H04N 25/772; H04N 25/42; H04N 25/47; H04N 25/77; H04N 25/78
See application file for complete search history.

(56) References Cited

U.S. PATENT DOCUMENTS

| | | | |
|---|---|---|---|
| 2013/0112848 A1* | 5/2013 | Lin | H04N 25/671 250/206 |
| 2017/0041489 A1* | 2/2017 | Furuta | G03G 15/043 |
| 2019/0297295 A1* | 9/2019 | Roberts | H04N 25/713 |
| 2021/0067724 A1* | 3/2021 | Iwata | H03M 1/1295 |
| 2021/0152757 A1* | 5/2021 | Wakabayashi | G06V 10/22 |
| 2021/0264147 A1* | 8/2021 | Kadambi | G06V 10/60 |

(Continued)

*Primary Examiner* — Georgia Y Epps
*Assistant Examiner* — Erin R Garber
(74) *Attorney, Agent, or Firm* — CHIP LAW GROUP

(57) ABSTRACT

A sensing and processing electronic circuit includes a sensing array having a plurality of sensing elements each having a sensor configured to produce an output signal in response to detection of an environmental parameter. The circuit includes a triggering unit configured to generate a trigger signal that causes an action to occur. The trigger signal is generated based on selected activated sensing elements satisfying one or more specifiable conditions. A sensing element is activated when a characteristic value based on the output value of the sensing element crosses one or more thresholds so that the characteristic value is above, below, within or outside of a specified range of values or when a difference value between the characteristic value and a previous or template value of the sensing element crosses one or more thresholds so that the difference value is above, below, within or outside of a specified range of values.

28 Claims, 4 Drawing Sheets

(56) References Cited

U.S. PATENT DOCUMENTS

2022/0132053 A1* 4/2022 Lin .................. H04N 25/42
2022/0172488 A1* 6/2022 Hirata ............... H04N 25/74
2023/0071929 A1* 3/2023 Mochizuki .......... H04N 25/57

* cited by examiner

Fig. 3a

Trigger on C2 columns
Count=2; Sum=P22+P32

Fig. 3b

Trigger on C2 and C4 columns
Count=4; Sum=P22+P32+P14+P34

Fig. 4a

Trigger on R2 row
Count=1; Sum=P22

Fig. 4b

Trigger on R2 and R4 rows
Count=4; Sum=P23+P43

Trigger on rectangle ROI:
Count=3; Sum=P22+P32+P34

Figure 5

Trigger on full frame
Count=5; Sum=P14+P22+P32+P34+P43

Trigger on full frame
Count=7; Sum=P14+P23+P34+P32+P33+P34+P43

Trigger on full frame ignoring pixel activation:
Sum=P11+P12+P13+P14+P21+P22+P23+P24+P31
+P32+P33+P34+P41+P42+P43+P44

Fig. 6c

Trigger on arbitrary ROI comprised of 8 pixels:
Count=3; Sum=P24+P34+P43

Fig. 7

SENSING AND PROCESSING UNIT GENERATING A TRIGGER SIGNAL UPON OCCURRENCE OF SPECIFIED CONDITIONS

CROSS REFERENCE TO RELATED APPLICATION

This application claims the benefit of U.S. Provisional Application Ser. No. 63/152,776, filed Feb. 23, 2021, the contents of which are incorporated herein by reference.

BACKGROUND

A Sensing Array (SA) is an array of sensing elements that can be used in imaging, as with light sensors in visible, infra-red and ultra-violet imaging, in electrochemical sensing arrays, or other electromagnetic sensing arrays such as magnetic field sensing or terahertz imaging. Properly biased sensors each typically convert the sensing quantity into a voltage, current, charge or resistance related to the physical quantity incident on the sensor. Sensing arrays may have sensors integrated with circuitry in a system-on-chip. A Sensing and Processing Device (SPD) is an array of computational structures at, near or including a sensing array (SA). In this way various functions including signal detection, collection, conditioning, preprocessing and readout are all performed by the SPD.

SUMMARY

In accordance with one aspect of the subject matter described herein, a sensing and processing electronic circuit includes a sensing array, an electronic front-end and digital processing circuitry, a read-out control unit and a triggering unit. The sensing array includes a plurality of sensing elements each having a sensor configured to produce an output signal in response to detection of an environmental parameter. The electronic front-end and digital processing circuitry is operatively associated with each of the sensing elements in the plurality of sensing elements for electronically processing the output signal received from the sensor included in the respective sensing element associated therewith. The read-out control unit is configured to selectively address and read out output values from the plurality of sensing elements. The triggering unit is configured to generate a trigger signal that at least in part causes an occurrence of an action. The trigger signal is generated based on selected activated sensing elements in the sensing array satisfying one or more specifiable conditions. A sensing element is activated when a characteristic value based on the output value of the sensing element crosses one or more thresholds so that the characteristic value is above, below, within or outside of a specified range of values or when a difference value between the characteristic value of the sensing element and a previous or template value of the sensing element crosses one or more thresholds so that the difference value is above, below, within or outside of a specified range of values.

In accordance with one particular implementation, the specifiable conditions are specified only for a selected region of interest (ROI) on the sensing array such that sensing elements outside of the ROI are ignored.

In accordance with one particular implementation, the selected ROI includes at least one specified row or column of sensing elements on the sensing array.

In accordance with one particular implementation, the specified conditions include specification of a predetermined sum of the characteristic values of the activated sensing elements in the selected ROI that is to be met or exceeded.

In accordance with one particular implementation, the specified conditions include specification of a sum of a total number of the activated sensing elements in the selected ROI that is to be met or exceeded.

In accordance with one particular implementation, the one or more thresholds and the specifiable conditions are selected so that the trigger signal is generated when an object enters and exits a field of view of the sensing array.

In accordance with one particular implementation, the triggering unit is configured such that the trigger signal is able to be generated before reading out any or all of the sensing elements from the sensing and processing device.

In accordance with one particular implementation, each of the sensing elements is configured to determine if the characteristic value of the respective sensing element crosses the one or more thresholds such that the respective sensing element is an activated sensing element.

In accordance with one particular implementation, each of the activated sensing elements is further configured to determine if the respective sensing element satisfies the one or more specifiable conditions. In accordance with one particular implementation, the characteristic value based on the output value of the sensing element is the output value of the sensing element.

In accordance with one particular implementation, the characteristic value based on the current output value of the sensing element is an output from an algorithm that uses the output value of the sensing element as an input value.

In accordance with one particular implementation, the template value is obtained from a template derived at least in part from previous output values from one or more of the sensing elements in the sensing array.

In accordance with one particular implementation, the template value is obtained from a template derived at least in part from an image that is expected to be captured by sensing elements in the sensing array.

In accordance with one particular implementation, the template value is randomly generated.

In accordance with one particular implementation, the template value is obtained from a template derived at least in part from a shift in sensing element values in an image that is expected to be captured by sensing elements in the sensing array.

In accordance with one particular implementation, the shift is obtained from an output of an algorithm.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 3a shows an example of a sensing array in which a trigger signal is based on an examination of the activated pixels in column C2; and FIG. 3b shows another example of a sensing array in which a trigger signal is based on an examination of the activated pixels in columns C2 and C4.

FIG. 4a shows an example of a sensing array in which a trigger signal is based on an examination of the activated pixels in row R2; and FIG. 4b shows another example of a sensing array in which a trigger signal is based on an examination of the activated pixels in columns R2 and R4.

FIG. 5 shows an example of a sensing array in which a trigger signal is based on an examination of the pixels in a region of interest (ROI) defined by the rectangular box depicted by the bold lines.

FIGS. 6a, 6b and 6c show examples of sensing arrays in which a trigger signal is based on an examination of the full frame.

FIG. 7 shows an example of an arbitrary region of interest (ROI) trigger in which the ROI includes pixels that are not adjacent to one another.

DETAILED DESCRIPTION

Figure 1:
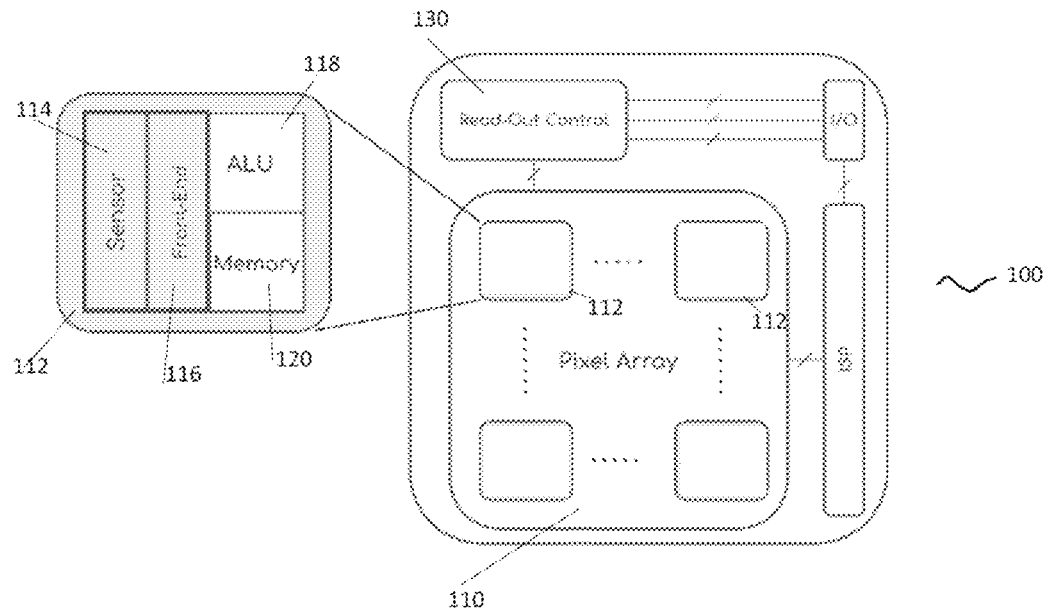
FIG. 1 shows one example of a Sensing and Processing Device (SPD).

FIG. 1 shows one example of a Sensing and Processing Device (SPD) 100. The SPD 100 includes a sensing array 110 of sensing elements (e.g., pixels) 112. It should be noted that the terms sensing element and pixel will generally be used interchangeably in the following discussion. Each sensing element 112 has a sensor 114 that produces an output signal (e.g., electric signal) in response to a physical quantity being imaged, an electronic front-end 116 that receives the electric signal from the sensor 114 and performs various electronic processing on the electric signal such as A/D conversion and gain control. Each sensing element 112 may also include digital processing circuitry such as the illustrative arithmetic logic unit (ALU) 118 and memory 120, which processes the digital values received from the electronic front-end 116. A read-out control unit 130 external to the sensor array 110 can use the sensing element address to read out the sensing elements, i.e., read the sensing element values after being processed by the electronic front-end 116 and the digital processing circuitry by sending the unique address and a read request to the sensor array 110.

Illustrative Sensing and Processing Device (SPD)

Figure 2:
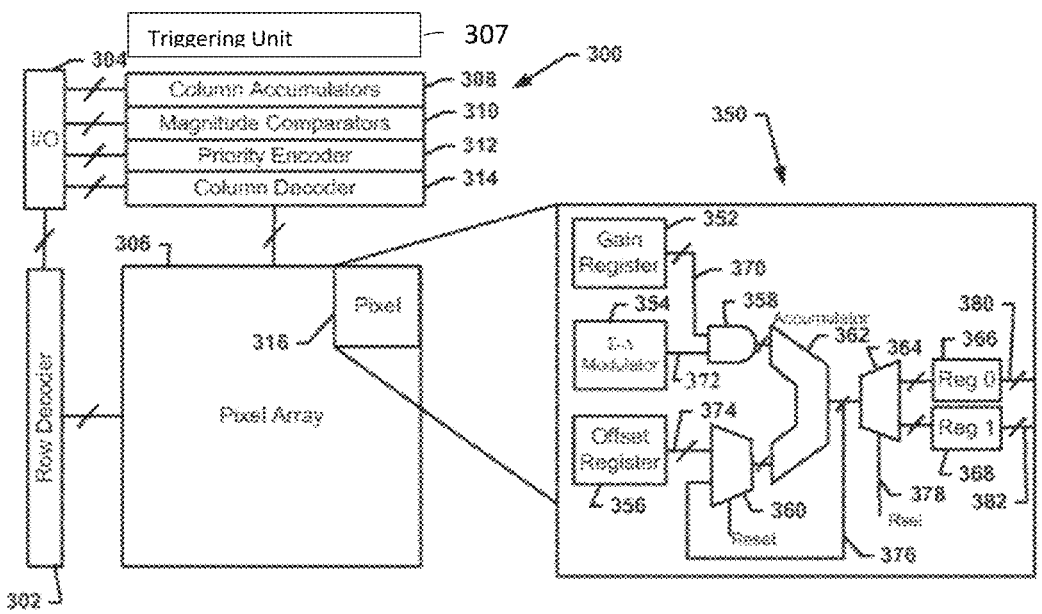
FIG. 2 shows one particular implementation of an SPD.

FIG. 2 show one particular implementation of an SPD that may be triggered based on preconfigured conditions in accordance with the methods described herein. It should be noted that this particular SPD is presented by way of illustration only and that the methods described herein may be applied to trigger a wide variety of different SPDs having different configurations.

Sensing and processing device 300 and a sensing element 350 in the sensing and processing device 300 are shown in FIG. 2. The sensing array 306 (which may be embodied as a pixel array) includes an array of sensing elements 316 (which may be embodied as pixel units), one of which is shown for illustration. A row decoder 302 and a column decoder 314 are used to address the sensing elements or pixels as appropriate, in a manner comparable to a standard memory, e.g., a random-access memory (RAM). An I/O block 304 is used for data input and output to various blocks and the sensing array 306, in a manner comparable to standard I/O blocks of peripherals. Additional blocks of the sensing and processing device 300 will be discussed following the description of the sensing element 350 architecture.

In one embodiment, activity of a sensor is converted from analog to digital. In another embodiment, activity of a sensor is converted from a continuous value, continuous time signal (of which class an analog signal is a subset) to a digital value. In the embodiment of a sensing element 350 shown in FIG. 2, analog-to-digital conversion of sensor activity is performed in part by a sigma delta modulator 354. The sigma delta modulator 354 produces a pulse train with a time varying frequency, for example, a binary value analog time signal or a frequency modulated signal. The number of pulses produced during a specified time interval is a function of the analog voltage, current or charge seen at the output of the sensor. This characteristic operation of a sigma delta modulator is known as pulse density modulation or pulse frequency modulation. Conversion to a digital value consists of counting the pulses during the specified time interval. This could be performed in one embodiment without gain modification by using a standard binary counter with a sufficient number of bits to avoid overflow with a maximum count. The binary counter would be initialized to zero, and count pulses by incrementing with each pulse, e.g., by using the pulse signal as a clock for an incrementing counter or by using the pulse signal as a count enable.

In the embodiment shown in FIG. 2, the sensing element 350 includes a gain register 352, the sigma delta modulator 354, an offset register 356, and an accumulator 362. In one embodiment, the accumulator 362 includes a fixed point adder or other computational structures. The gain register 352 is read/write accessible and stores a gain value which can be less than one, equal to one or greater than one. In other words, the gain value has a range spanning to both sides of unity gain, inclusive. In one embodiment, the gain value is stored as a fixed point number. Further embodiments can use floating point arithmetic, and binary or binary coded decimal numbers. The offset register 356 is read/write accessible and stores an offset value which can be less than zero, zero, or greater than zero. In other words, the offset value has a range spanning to both sides of zero offset, inclusive. In one embodiment, the offset value represents the dark current or dark voltage of a sensor, which relates to the activity of the sensor when no light is incident. In another embodiment, the gain value represents the slope of the sensor response to light incident on the sensor. As each sensing element or pixel has a respective gain register 352 and a respective offset register 356, the sensors can be calibrated and individual differences accounted for across the array, with the sensing elements or pixels having individual adjustment to the sensed values accordingly.

In some embodiments, the offset and/or gain are modified in a time varying manner based on sensing element or pixel, and/or local, and/or global characteristics, as determined by an external controller or by additional circuitry internal to the sensing element or pixel or the sensing and processing device.

Modification of the sensed value, in each sensing element or pixel, proceeds as follows. At reset, the offset register 356 value is placed into the accumulator 362. This action is controlled by the multiplexer 360, which can select a multibit value from the output 374 of the offset register 356, or can select the output 376 of the accumulator 362. Further embodiments can be readily devised for loading the value of the offset register into the accumulator 362. When reset is released, counting of pulses from the sigma delta modulator 354 proceeds. It should be understood that the reset signal may be an externally or internally generated signal.

When the output 372 of the sigma delta modulator 354 is zero, i.e., no pulse is present, the multibit output of the AND gate 358 is zero, and the accumulator 362 retains the previous accumulated value. When the output of the sigma delta modulator 354 is a binary one, i.e., a pulse, the multibit output of the AND gate 358 is equal to the multibit output 370 of the gain register 352, and the accumulator adds the gain value to the previous accumulated value. The accumulator thus increments by the gain value with each pulse from the sigma delta modulator 354. The gain value is an incremental value added, i.e., counted, in response to each of a plurality of pulses from the sigma delta modulator. In some embodiments, a specified interval timer may control the length of time over which the pulses are counted. In one embodiment, the interval timer is programmable. In some embodiments, the sigma delta modulator may be of the multibit type, in which case the output is multiplied (rather than ANDed) with the gain register output.

It should be appreciated that, by using the gain value and the offset value in the above-described manner, the sensing element or pixel applies an offset and a gain as a modification or a correction to the sensed value from the sensor. Two-point nonuniformity correction is achieved by starting the accumulator at a non-zero value, for offset correction, and incrementing by a fractional value greater or less than one, for gain correction. In one embodiment, an ideal sensor would receive a zero offset and a unity gain. It should also be stated that a more sophisticated nonuniformity correction can be implemented (e.g. 4-point NUC)

Further embodiments contain multiple gain registers, such that the particular gain value used by the accumulator is controlled by an external or internal signal. In this manner, the set of gains can be switched instantaneously in order to, for example, account for a change in the environment, sensor biasing, sensor type, or to facilitate synchronous detection of weak signals.

The output 376 from the accumulator 362 can be selectively latched in either of two output registers 366, 368, as directed by a register select 378 and a demultiplexer or selector 364. In one embodiment, one of the output registers 366, 368 stores the most recent sensing element or pixel value and the other of the output registers 366, 368 stores the immediately preceding sensing element or pixel value or another prior or preceding value of the sensing element or pixel. Further embodiments, such as storing multiple preceding values or storing only the most recent sensing element or pixel value, are readily devised. It should be appreciated that one output register 366 can be read out by an output port 380, and the other output register 368 can be read out by a further output port 382.

Further embodiments contain multiple accumulator circuits within the sensing element or pixel controlled by additional reset signals, so that the respective time intervals are longer, shorter, and/or overlapping. It should be understood that such additional accumulator circuits may make additional output registers, and/or gain registers, and/or offset registers desirable.

Returning to the sensing and processing device 300 in FIG. 2, the embodiment shown includes a triggering unit 307, column accumulators 308, magnitude comparators 310 and priority encoder 312. The magnitude comparators 310 are coupled to the output registers 366, 368 of the sensing elements 316, 350. In some embodiments, the magnitude comparators 310 detect if the sensing element or pixel output is within an acceptance interval. Further embodiments detect if the variance of the sensing element or pixel output is within an acceptance interval. Further embodiments detect if the difference between the two output registers of the sensing element or pixel of the currently selected row are within an acceptance interval. In this manner, changes in sensing element or pixel values can be detected. High and low thresholds of the acceptance interval are programmable on a column by column basis, and/or row by row, and/or sensing element by sensing element or pixel by pixel, in some embodiments. In some embodiments, the high and low thresholds are adjusted automatically based on the sensing element or pixel output or a local and/or global measure.

Further embodiments contain a time counter in each sensing element or pixel which can be reset when the sensing element or pixel is read, and whose value can be used to further discriminate which sensing element or pixels are read out. In these embodiments, additional comparators detect if the time counter value is within an acceptance interval. Readout may require both magnitude and time to be within acceptable intervals.

The priority encoder 312 sorts the acceptable sensing elements or pixels, e.g., from left to right, and can output column addresses of acceptable sensing elements or pixels sequentially in one embodiment. The magnitude comparators 310 and the priority encoder 312 thus form an autonomous mechanism, which can alert a CPU (central processing unit) or external controllers or devices to readout only sensing elements or pixels of interest, which may represent a small fraction of the total array and reduce processing overhead. The column accumulators 308 include a column accumulator for each column of the sensing element array 306, which sums the intensity of all the sensing elements or pixels in the column. To prevent overflow, the column accumulators have more bits than the sensing element or pixel accumulators, in some embodiments. The column accumulators 308 provide information useful for algorithms requiring average sensing element or pixel intensity which includes sensing elements or pixels that are not read out.

Further embodiments sort the sensing elements or pixels according to rank rather than in a fixed positional order. In these embodiments, the rank is the amount by which the sensing element or pixel output exceeded the threshold or failed to exceed a minimum threshold. For example, in the case of change detection, the sensing elements or pixels with the greatest amounts of change may have a higher or lower priority than the sensing element or pixel with more modest amounts of change.

Further embodiments of the sensing element or pixel contain circuitry to automatically remove the sensing element or pixel from consideration by the autonomous mechanism.

Additional details of the embodiments of the SPD described above in connection with FIG. 2 may be found in U.S. Pat. No. 9,200,954.

Triggers

As explained in more detail below, a trigger signal is generated by the SPD when individual sensing elements or pixels satisfy certain conditions. These conditions may be based, for example, on the values of the sensing elements, the sum of the sensing elements, and/or on the total number of sensing elements that collectively satisfy certain conditions. The trigger signals (or simply "triggers") can be used for any desired purpose, such as to interrupt a processor to perform processing, to change the SPD's mode of operation, and so on. In addition, the occurrence of a trigger can cause full frames, event-based frames, or select sensing elements to be readout. As shown in the particular embodiment of the SPD shown in FIG. 2, a triggering unit 307 may be provided to generate the trigger signal when it is determined that the necessary conditions have been satisfied.

As used herein an individual sensing element or pixel in an SPD operating in accordance with a normal operating mode is said to be "activated" if it has a characteristic value that crosses one or more thresholds so that the value is above, below, within or outside of a specified range of values. The characteristic value of the sensing element may be based on its output value. For instance, in some cases the characteristic value may be the actual output value of the sensing element or an output from an algorithm that uses the actual output value of the sensing element as its input value.

In some embodiments the sensing array may be able to operate in a differencing or change detection mode as well as a normal or intensity (color) or depth mode or any combination thereof. In a differencing or change detection mode of operation, the SPD computes the difference between the current pixel value and some other pixel value, such as the pixel value in the previous frame or a pixel value in a template frame, for example. In this mode the thresholds that are established are compared against the difference between each pixel's current value and another value e.g., its value in the previous frame (or in some cases the absolute value of the difference value). In differencing mode, an individual sensing element or pixel in an SPD is said to be "activated" if it has a difference value that crosses one or more thresholds so that the value is above, below, within or outside of a specified range of values. It should be noted that in some embodiments, although pixels may be activated based on their difference value, as a general matter it is the current pixel value that is readout from the pixel, not the difference value. In other embodiments, however, the difference value may be readout from the pixel.

In general, the threshold values that are used to cause a pixel to be activated can be set in any desired manner. For instance, they could be independently set for each pixel, independently set for each row/column, or set for the entire sensing array in the SPD. Accordingly, threshold registers may be provided for each pixel, column or row, sensing array, or region of interest, depending on the type of threshold that is employed. If the thresholds are provided for each individual pixel, for instance, the threshold registers may be provided within each individual pixel. Moreover, the threshold values can be static or they can change dynamically during an application. As discussed above, in some embodiments the magnitude comparator 310 shown in the illustrative SPD of FIG. 2 may be used to perform the comparison of the pixel values to the thresholds as well as to store the threshold values themselves, which may be programmed or otherwise provided to the magnitude comparator 310 in any suitable manner. While FIG. 2 shows the magnitude comparator 310 being located external to the sensing array 306 and performing the comparison at the sensor array level, more generally the functionality of the magnitude comparator may be located in, or associated with, any suitable portion of the SPD including the pixel. For example, in some embodiments each individual pixel may include a magnitude comparator so that the comparison of the pixel values to the thresholds can be accomplished across all the pixels at one time. That is, in these embodiments the comparison may be performed within each individual pixel. In one particular implementation, for instance, the magnitude comparator 310 may be located at the output of selector 364 or on each of the outputs of the registers 366 and 368.

In accordance with the techniques described herein, the sensors or pixels in an SPD such as the SPDs described above can be used as triggers that are generated when activated pixels satisfy one or more preconfigured conditions. The occurrence of a trigger can cause full frames, event-based frames, or only the activated sensors to be readout and/or a signal to be generated that is sent to an external system indicating that certain pixels have been activated and satisfy a preconfigured condition or conditions. That is, a trigger is generated when individual sensing elements or pixels have values that satisfy a certain threshold criteria or criterion (such that they are activated) are also found to meet one or more preconfigured conditions.

For instance, a column or row trigger may be defined as occurring when a predetermined number of pixels in a selected column or row are activated by virtue of exceeding a threshold and/or when the sum of the values of those activated pixels exceeds a predetermined value. As another example, a region of interest (ROI) trigger may be defined as occurring when a predetermined number of pixels in a predetermined ROI are activated by virtue of exceeding a threshold and/or when the sum of the values of those activated pixels exceeds a predetermined value. Of course, a nearly unlimited number of other types of triggers may be generated by specifying a nearly unlimited number of different combinations of thresholds and conditions that may be established in addition to the illustrative examples presented herein.

In some embodiments the thresholds to which pixel values (or pixel difference values) are compared may be derived from various templates or algorithms. For example, pixel difference values may be compared to values in a template of a previously collected background image or a previous image collected by the pixel or a reference with arbitrary values, possibly including random ones. In other embodiments, pixels could be activated based on a comparison of the threshold to an output of an algorithm (that may or may not operate within the SPD) that processes the pixel values. For example, if the pixel values are input through an edge detection algorithm (such as a Sobel operator), then its output (which is no longer pixel intensity) could be compared to one or more thresholds. If as a result of the comparison the pixel is activated, the pixel output could be either the original pixel value or the value output by the algorithm. As another example, a foreground extraction algorithm may be used so that only those pixels that are not part of the background are activated.

In some embodiments the template to which the characteristic value may be compared is a characteristic value from a previous frame (or previous exposure period). In other embodiments the template may be a characteristic value from the Nth previous frame (or Nth previous exposure period). Since the template values can be statically or dynamically established by the pixel itself, a processing unit within the SPD, or even a processor external to the SPD, the template may be established in any desired manner and need not be based on a previous characteristic value. For instance, the template may be set based on values from a previously collected image (e.g., intensity, color, depth, characteristic value. etc), expected values in an expected image (e.g., intensity, color, depth, characteristic value, etc) that is to be collected by the SPD, or even random values. While a previously collected image may be used for applications such as foreground extraction, an expected image could be used for applications such as defect detection and correlation, and random values could be used in applications such as encryption.

Some particular examples of thresholding will now be presented in which two thresholds Th1 and Th2 are used. If Th1<Th2, then Th1 and Th2 may be thought of as a low threshold and a high threshold, respectively. Since only two thresholds are used in these examples, in some implementations these two thresholds may be stored in two registers. As discussed above, these registers may be incorporated, for instance, in the magnitude comparator 310s shown in FIG. 2 discussed above.

The following examples establish two thresholds Th1 and Th2 for each pixel in the sensor array. For instance, in one particular example, when the differencing or change detection mode is disabled and Th1<Th2, then only pixels whose intensities are in the range [Th1, Th2] are considered activated. In another particular example, when the differencing mode is disabled and Th2<Th1, then only pixels whose values are in the range [MIN, Th2]∥[Th1, MAX] are considered activated. That is, while in the first case only pixels having values between Th1 and Th2 are activated, in the second case only pixels having values less than Th2 and pixels having values greater than Th1 are activated. These two examples are respectively summarized in the first two rows of Table 1 below. The third and fourth rows present special cases of the first example, where in row three Th1=0 and Th2>0 and in row four Th2 has its maximum value and Th1>0.

In another particular example, when the differencing mode is enabled and Th1<Th2, then only the pixels where the difference between its current value intensity and its previous value or a template value are in the range [Th1, Th2] are considered activated. Likewise, when the differencing mode is enabled and Th2<Th1, then only the pixels where the difference between its current value and its previous or a template value are in the range [MIN, Th2]∥[Th1, MAX] are considered activated. These two examples are respectively summarized in the fifth and sixth rows of Table 1 below, followed by two special cases of the example in row five.

The following examples present some illustrative triggers that may be generated. These triggers assume that certain pixels in the sensor array have already been activated. A trigger is then generated when the activated pixels satisfy one or more pre-established conditions. The shaded pixels illustrated in the following figures are pixels that have been activated.

TABLE 1

| Row Number | Differencing | Thresholds | Output | Note |
|---|---|---|---|---|
| 1 | No | TH1 < TH2 | Intensity x where x∈ [TH1, TH2] | Activate intensities in range TH1 to TH2. |
| 2 | No | TH2 < TH1 | Intensity x where x∈ [MIN, TH2] U [TH1, MAX] | Activate small and large intensity pixels. |
| 3 | No | TH1 = 0, TH2 > 0 | Intensity x where x∈ [MIN, TH2] | Activate small intensity pixels. |
| 4 | No | TH2 = MAX, TH1 > 0 | Intensity x where x∈ [TH1, MAX] | Activate large intensity pixels. |
| 5 | Yes | TH1 < TH2 | Intensity x where (x − y)∈ [TH1, TH2] | Activate pixels with intensity differences in range TH1 TO TH2. |
| 6 | Yes | TH2 < TH1 | Intensity x where (x − y) ∈[MIN, TH2] U [TH1, MAX] | Activate pixels with small and large intensity differences. |
| 7 | Yes | TH1 = MIN, TH2 > MIN | Intensity x where (x − y) ∈[MIN, TH2] | Activate pixels with small intensity differences. |
| 8 | Yes | TH2 = MAX, TH1 > MIN | Intensity x where (x − y) ∈[TH1, MAX] | Activate pixels with large intensity differences. | x represents pixel values in the current frame where y represents pixel values of a template value (which could be based on the previous image collected or a static background image or any arbitrary reference, possibly including randomly generated values).

Row/Column Trigger

A row/column trigger may be based on an examination of the activated pixels in one or more of the 1 to N columns (not necessarily consecutive) and/or 1 to M rows (not necessarily consecutive) in the sensor array. For instance, a trigger may be generated when the number of activated pixels and/or the sum of the activated pixel values surpasses a predetermined total number of pixels and/or a predetermined total pixel value. That is, the activated pixels in the selected column(s)/row(s) are examined and their quantity (i.e., the total number of activated pixels) and/or values (e.g., intensities) summed. If a trigger becomes enabled, it can either trigger an external system or the sensing array itself perform some action.

For example, a trigger may be generated by examining a single column on the left side of the sensor's field of view, thereby enabling the trigger when an object enters the field of view from the left. The trigger may cause an external sensor or SPD itself to start monitoring the field of view. The trigger can also enable the SPD to start recording full images, similar to the operation of a conventional camera, or to record only activated pixels in order to monitor motion within the field of view.

FIG. 3a show an example in which a trigger is based on an examination of the activated pixels in column C2. In this example, there are two activated pixels and the trigger is generated based on the sum of the values of pixel P22 and Pixel 32. FIG. 3b show another example in which a trigger is based on an examination of the activated pixels in columns C2 and C4. In this example, there are a total of four activated pixels and the trigger is generated based on the sum of the values of pixel P22, pixel 32, pixel 14 and pixel 34. FIGS. 4a and 4b show similar examples of two row triggers.

Region of Interest (ROI) Trigger

In another example, a region of interest (ROI) may be selected on the sensor array such that any pixels outside of the ROI are ignored. This region of interest may be defined or programmed in the SPD in any suitable manner. For instance, a rectangular ROI may be specified starting with an x pixel address and a y pixel address, followed by a specification of the ROI width and height. Once the ROI is defined, the SPD itself or an external system can continue monitoring the ROI (and only the ROI) until the number of activated pixels and/or the sum of the activated pixel values in the ROI surpasses a predetermined value. When this value is met the trigger becomes enabled and can either trigger an external system or the SPD itself to take some action.

FIG. 5 shows an example in which a trigger is based on an examination of the pixels in the ROI defined by the rectangular box depicted by the bold lines. In this example three pixels P22, P32 and P34 are activated and the trigger is generated based on the sum of the values of these pixels.

Global Intensity Trigger

In another example, a trigger may be based on a global examination of all of the activated pixels in the sensing array. The global examination, which may involve a summation of all the pixel values in the sensing array, can be compared against a predetermined value to determine if the trigger should be enabled. This can be accomplished based on the average pixel intensity as well by dividing the global summation of all of the pixels by the number of pixels. The SPD may perform the global summation of all the pixels in the sensor itself, or, alternatively, this operation could be performed on an external system.

In one example, if the global summation is larger than a predefined value, then the image may be saturating and the integration time can be adjusted to collect less light.

Conversely, if the global summation is smaller than a predefined threshold value, then the image may not be capturing enough photons and the integration time can be adjusted to collect more light. A sensing array having a trigger based on a global examination of all the pixels in the sensing array could also be used as a wake-up sensing array in a product where the sensor is used as a light sensor to trigger when to wake-up and to act thereafter as a conventional imaging sensor. The sensing array may trigger itself to wake-up and start collecting full images when there is a sudden change in the value of the global summation, or when the sensing array senses sufficient light across the entire sensing array.

FIGS. 6a and 6b show examples of global intensity or full frame triggers. In the example of FIG. 6a there are five activated pixels and the trigger is generated based on the sum of the values of pixels P14, P22, P32, P34 and P43. Similarly, in the example of FIG. 6b there are seven activated pixels and the trigger is generated based on the sum of the values of pixels P14, P23, P24, P32, P33, P34 and P43. FIG. 6c shows yet another example where the trigger ignores whether or not a pixel is activated and sums the values of all the pixels.

Arbitrary ROI/Shape Trigger

In yet another example, a trigger may be based on an arbitrary region of interest (ROI) or shape. Moreover, the ROI may include pixels that are not adjacent to one another. This trigger could be implemented on an external system monitoring activated pixels in the ROI or in the sensor array itself with independent thresholds set for the individual pixels in the ROI. Any pixels not in the ROI would be ignored and only pixels in the ROI would be activated and monitored. The activated pixels would be monitored until the number of activated pixels and/or the sum of the activated pixel values in the ROI surpasses a predetermined value. When this value is met the trigger becomes enabled and can either trigger an external system or the SPD itself.

FIG. 7 shows an example of an arbitrary ROI trigger in which the ROI includes pixels that are not adjacent to one another. In this example the ROI includes the pixels encompassed by the four rectangles outlined in bold and which in total encompass eight pixels. In this example three activated pixels are shown, P24, P34 and P43.

Object Presence Trigger

More complex applications can be handled by using more complex triggers. For example, an object presence monitoring system can be enabled that detects when an object enters as well as exits the field of view of the sensor array. Specifically, this trigger can monitor two regions of interest to determine when an object is entering and then leaving the field of view. When the object is determined to be within the field of view the trigger becomes enabled and can either trigger an external system or the sensing array itself to thereby cause some action to be performed.

For example, in one particular application, vehicles could be detected as they enter and exit the field of view of an SPD deployed on a toll road. Two regions of interest can be defined (ROI 1 and ROI 2.) ROI 1 may be defined as columns (or rows) M0 to M1 and ROI 2 may be defined as columns (or rows) N0 to N1. The SPD can monitor the number of activated pixels or and/or the sum of activated pixel values in ROI 1 until it exceeds a predetermined value (value1), at which point an object is declared as entering into the field of view. In the meantime, the pixel values in ROI 2 are saved in memory. The sensing array then may be switched to either full frame mode or event mode and the data transferred from the sensing array for additional processing (such as for detecting the presence of an axle on a car).

The difference in pixel values between the most recent image(s) and the saved background values for ROI 2 (which have been saved to memory) are computed to determine the number of activated pixels in ROI 2 that exceed a second predetermined value (value2). When this occurs, the object is declared to be exiting the field of view. Once the object has left the field of view, the SPD can resume monitoring the number of activated pixels or the sum of activated pixel values in ROI 1 for a new object entering the sensor array's field of view.

Defect Detection/Correlation Trigger

In another example, the template values used by the SPD may be set to expected characteristic values in a particular field of view or scene (or even random values). In some cases these values may be shifted by the mean value of the expected characteristic values in order to maximize an algorithm such as the dot product, for instance. In one particular example, the template values could be chosen to be the expected characteristic values obtained from an object (with a known orientation) moving through the field of view of the SPD on e.g., a conveyor belt shifted by the mean of the expected characteristic values. The SPD can perform a multiplication of the template values with the values in an incoming image (e.g., intensity, color, depth, etc) signal that is received in parallel and then perform a global summation (either within or external to the SPD). These operations effectively compute the dot product of the values and provide a measure of correlation as to whether the expected object is within the field of view as expected, within the field of view with a possible defect, or not in the field of view at all. The degree of correlation can then be used to trigger, for example, a system for determining whether the object is present with no defects, the object is present with possible defects, the object is absent, etc. Factors that could affect the correlation value are the object being rotated from a known or expected orientation, the object missing a component, the object having an additional component, and so on. These factors may affect the correlation because they were not taken into account by the template that was derived from expected characteristic values, thus degrading the output of the dot product.

For clarity, it should be noted that the dot product referred to above may be defined as an element-wise multiplication that is performed between a and b and the corresponding elements are summed together. This can be summarized as:

$$a \cdot b = \sum_{i=1}^{N} \sum_{j=1}^{M} a_{i,j} b_{i,j}$$

where a is a 2D input signal, b is a 2D template signal, N is the number of columns, and M is the number of rows.

While the various embodiments of the SPD presented above have described a trigger signal as being generated based on a summation of a total number of activated pixels or a summation of the activated pixel values, in some alternative embodiments the trigger signal may be generated based on these summations independent of whether or not the pixels are activated. That is, in these embodiments a trigger signal may be generated based on a summation of a total number of pixels (whether or not activated) or a summation of pixel values (whether or not the pixels are activated). For instance, in some particular implementations, column triggers and full frame triggers may be generated while ignoring whether or not the pixels involved are activated.

Several aspects of the sensing and processing device are presented in the foregoing description and illustrated in the accompanying drawing by various blocks, modules, components, units, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure.

Various embodiments described herein may be described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

A computer program product can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The various embodiments described herein may be implemented in various environments. Such environments and related applications may be specially constructed for performing the various processes and operations according to the disclosed embodiments or they may include a general-purpose computer or computing platform selectively activated or reconfigured by code to provide the necessary functionality. Embodiments described herein may be practiced with various computer system configurations including hand-held devices, tablets, microprocessor systems, microprocessor-based or programmable consumer electronics, minicomputers, mainframe computers and the like. However, the processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques. In some cases the environments in which various embodiments described herein are implemented may employ machine-learning and/ or artificial intelligence techniques to perform the required methods and techniques.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

The invention claimed is:

1. A sensing and processing device, comprising:
 a sensing array that includes a plurality of sensing elements, wherein each sensing element of the plurality of sensing elements includes:
  a sensor configured to produce an output signal; and
  an electronic front-end and digital processing circuitry that includes an arithmetic logic unit and a memory, wherein the electronic front-end and digital processing circuitry is configured to:
   process the produced output signal of a respective sensing element of the plurality of sensing elements;
   set a first threshold value and a second threshold value for the respective sensing element, wherein the first threshold value is different from the second threshold value, wherein
    the first threshold value and the second threshold value correspond to a plurality of threshold criteria, and the plurality of threshold criteria includes:
a first range of values lower than a smaller of the first threshold value and the second threshold value set for the respective sensing element,
a second range of values higher than a larger of the first threshold value and the second threshold value set for the respective sensing element, and
a third range of values that are in one of the first range of values or the second range of values;
a read-out control unit configured to selectively address and read out an output value related to the output signal from at least one of the plurality of sensing elements, wherein each sensing element, of the plurality of sensing elements, is configured to activate based on one of:
a characteristic value, of a corresponding sensing element of the plurality of sensing elements, that is within one of the first range of values, the second range of values, or the third range of values related to a threshold criterion of the plurality of threshold criteria, wherein
the threshold criterion is related to the corresponding sensing element, and
the characteristic value is related to the output value of the corresponding sensing element, or
a difference value that is within one of the first range of values, the second range of values, or the third range of values related to the threshold criterion, wherein
the threshold criterion is related to the corresponding sensing element, and
the difference value is a difference between the characteristic value of the corresponding sensing element and a previous or template value of the corresponding sensing element; and
a triggering unit configured to generate a trigger signal that causes an occurrence of an action, wherein the generation of the trigger signal is based on:
a number of the activated set of sensing elements being higher than a third threshold value, or
a sum of characteristic values of the activated sensing elements being higher than a fourth threshold value different from the third threshold value, wherein the characteristic values include the characteristic value.

2. The sensing and processing device of claim 1, wherein the sensing array further includes a plurality of regions of interest (ROIs), and
the first threshold value and the second threshold value are programmable for the plurality of ROIs on the sensing array such that sensing elements of the plurality of sensing elements outside of the plurality of ROIs are ignored.

3. The sensing and processing device of claim 2, wherein the plurality of ROIs includes at least one specified row or column of the plurality of sensing elements on the sensing array.

4. The sensing and processing device of claim 2, wherein the plurality of ROIs includes one or more sensing elements that are not adjacent.

5. The sensing and processing device of claim 2, wherein the first threshold value and the second threshold value are specified only for the plurality of ROIs.

6. The sensing and processing device of claim 1, wherein the first threshold value and the second threshold value are programmable such that the trigger signal is generated in a case where an object enters and exits a field of view of the sensing array.

7. The sensing and processing device of claim 1, wherein the triggering unit is further configured to generate the trigger signal before read out of any or all of the plurality of sensing elements from the sensing and processing device.

8. The sensing and processing device of claim 1, wherein the characteristic value related to the output value of the corresponding sensing element is an output from an algorithm that uses the output value of the corresponding sensing element as an input value.

9. The sensing and processing device of claim 1, wherein the template value is obtained from a template derived at least in part from previous output values from one or more of the plurality of sensing elements in the sensing array.

10. The sensing and processing device of claim 1, wherein the template value is obtained from a template derived at least in part from an image that is expected to be captured by the plurality of sensing elements in the sensing array.

11. The sensing and processing device of claim 1, wherein the template value is randomly generated.

12. The sensing and processing device of claim 1, wherein the template value is obtained from a template derived at least in part based on a shift in sensing element values in an image that is expected to be captured by the plurality of sensing elements in the sensing array.

13. The sensing and processing device of claim 12, wherein the shift is obtained from an output of an algorithm.

14. The sensing and processing device of claim 1, wherein the triggering unit is further configured to generate the trigger signal that causes the occurrence of the action that triggers a system external to the sensing and processing device.

15. The sensing and processing device of claim 1, wherein
the sensing array further includes a plurality of regions of interest (ROIs), and
the first threshold value and the second threshold value are programmable only for the plurality of ROIs on the sensing array such that sensing elements of the plurality of sensing elements outside of the plurality of ROIs are ignored.

16. The sensing and processing device of claim 1, wherein the generation of the trigger signal is based on a global examination of all the plurality of sensing elements.

17. The sensing and processing device of claim 1, wherein the trigger signal interrupts a processor to perform processing.

18. The sensing and processing device of claim 1, wherein the third threshold value for the number of the activated sensing elements is different from the first threshold value and the second threshold value.

19. The sensing and processing device of claim 1, wherein each sensing element of the plurality of sensing elements includes a gain register and an offset register.

20. The sensing and processing device of claim 19, wherein a gain value of the gain register is different for each sensing element of the plurality of sensing elements.

21. The sensing and processing device of claim 19, wherein an offset value of the offset register is different for each sensing element of the plurality of sensing elements.

22. The sensing and processing device of claim 1, wherein each sensing element of the plurality of sensing elements includes:
a plurality of gain registers configured to output a plurality of gain values; and an accumulator configured to switch between the plurality of gain values output by the plurality of gain registers, wherein the switch between the plurality of gain values is based on one or more conditions.

23. The sensing and processing device of claim 1, further comprising a priority encoder configured to sort the activated set of sensing elements, wherein the read-out control unit is further configured to selectively address and read out the output value from each sensing element of the sorted set of sensing elements.

24. The sensing and processing device of claim 1, wherein
the plurality of threshold criteria further includes a fourth range of values between the first threshold value and the second threshold value set for the respective sensing element,
each sensing element, of the plurality of sensing elements, is configured to activate based on one of:
the characteristic value, of the corresponding sensing element of the plurality of sensing elements, that is within the fourth range of values, or
the difference value, of the corresponding sensing element of the plurality of sensing elements, that is within the fourth range of values.

25. The sensing and processing device of claim 1, wherein the first threshold value is lower than the second threshold value.

26. The sensing and processing device of claim 1, wherein the first threshold value is greater than the second threshold value.

27. The sensing and processing device of claim 1, wherein
each sensing element of a first set of sensing elements of the plurality of sensing elements is configured to activate based on one of:
the characteristic value, of the corresponding sensing element of the first set of sensing elements, that is within the first range of values, or
the difference value, of the corresponding sensing element of the first set of sensing elements, that is within the first range of values,
each sensing element of a second set of sensing elements of the plurality of sensing elements is configured to activate based on one of:
the characteristic value, of the corresponding sensing element of the second set of sensing elements, that is within the second range of values, or
the difference value, of the corresponding sensing element of the second set of sensing elements, that is within the second range of values, and
the first set of sensing elements is different from the second set of sensing elements.

28. The sensing and processing device of claim 1, wherein
the electronic front-end and digital processing circuitry is further configured to select a range of values, for the plurality of sensing elements, from the first range of values, the second range of values, and the third range of values, and
each sensing element, of the plurality of sensing elements, is configured to activate based on one of:
the characteristic value, of the corresponding sensing element of the plurality of sensing elements, that is within the selected range of values, or
the difference value, of the corresponding sensing element of the plurality of sensing elements, that is within the selected range of values.

\* \* \* \* \*